Figure 1:
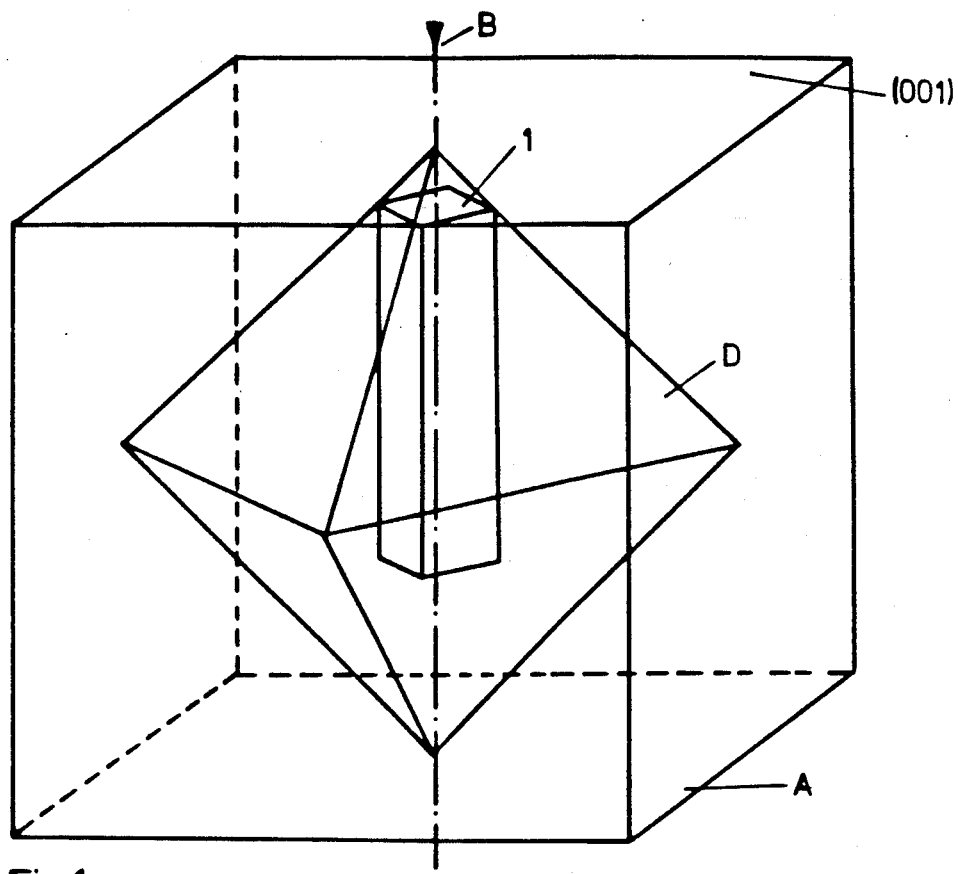

United States Patent [19]

Redlich

[11] Patent Number: 4,748,612

[45] Date of Patent: May 31, 1988

[54] ARRANGEMENT FOR CUTTING INFORMATION INTO A RECORD CARRIER MADE OF METAL, PARTICULARY COPPER

[75] Inventor: Horst Redlich, Berlin, Fed. Rep. of Germany

[73] Assignee: Teldec Schallplatten GmbH, Hamburg, Fed. Rep. of Germany

[21] Appl. No.: 810,332

[22] Filed: Dec. 2, 1985

[30] Foreign Application Priority Data

Apr. 2, 1984 [DE] Fed. Rep. of Germany ....... 3412270

[51] Int. Cl.⁴ .............................................. G11B 3/44
[52] U.S. Cl. ............................. 369/173; 76/DIG. 12; 125/39; 369/170
[58] Field of Search ............... 369/173, 170, 171, 172; 125/35, 39; 51/229, 216 R; 76/DIG. 12, DIG. 82

[56] References Cited

U.S. PATENT DOCUMENTS 2,187,512  1/1940  Capps .
2,530,284 11/1950  Capps .
2,544,495  3/1951  Franz .
3,184,242  5/1965  Marcucci .
3,781,020 12/1973  Batsch et al. .
3,877,705  4/1975  Joschko et al. ...................... 369/173
4,531,207  7/1985  Redlich et al. ....................... 369/173

FOREIGN PATENT DOCUMENTS 1180156 10/1964  Fed. Rep. of Germany .
2319407 11/1974  Fed. Rep. of Germany .
2548263  5/1976  Fed. Rep. of Germany .
2811888  9/1979  Fed. Rep. of Germany .
2231471 12/1974  France .

OTHER PUBLICATIONS

"Micromachining Videodisc Grooves and Signals", Guatrachihi et al., RCA Review, 3/82.

Primary Examiner—Steven L. Stephan
Attorney, Agent, or Firm—Spencer & Frank

[57] ABSTRACT

An arrangement is disclosed for cutting information into a record carrier made of metal, particularly of copper by means of a diamond, with the diamond body being adjusted for cutting under a canting angle and being ground in such a manner that, deviating from the prior art manner, the cutting edge does not coincide with a diamond zone of optimum hardness but deviates from the optimum position by an angle which is preferably equal to the canting angle.

8 Claims, 3 Drawing Sheets

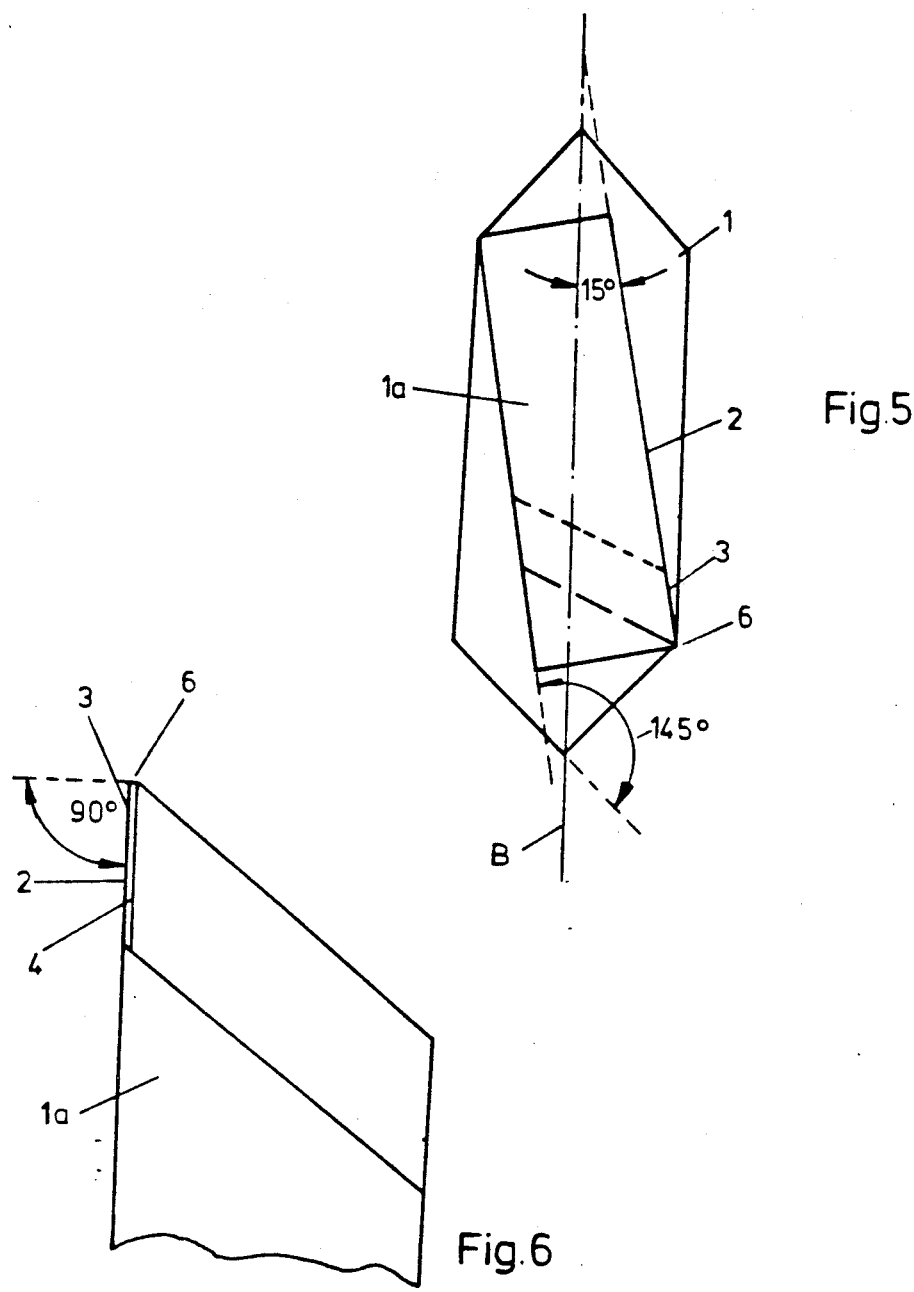

ARRANGEMENT FOR CUTTING INFORMATION INTO A RECORD CARRIER MADE OF METAL, PARTICULARY COPPER

The invention relates to an arrangement as defined in the preamble of claim 1.

Diamonds as tools and as pickups for phonograph records are known (Ind. Diam. Rev. 1967, No. 2, pages 89–95). It is also known that diamonds have hard and softer zones and that an incorrectly adjusted diamond pickup wears out faster than a correctly adjusted pickup. It is further known how to correctly adjust such a pickup (German Pat. No. 1,180,150). According to this patent, two opposing hard lines of the pickup diamond should face the walls of the sound groove in the phonograph record. No corresponding special teachings exist for diamonds to be used for cutting information into a phonograph record or a preliminary stage thereof. Such cutting diamonds are manufactured, like the pickups, under consideration of their hard zones. As soon as the cutting edges are worn, they are reground.

In connection with cutting information into metal surfaces, it has been found that cutting diamonds cut according to the teachings for pickup diamonds wear relatively quickly. It is the object of the invention to reduce the wear of cutting diamonds.

This is accomplished by the invention a defined in claim 1. Further features of the invention are defined in the dependent claims.

The invention is based on the realization that diamonds ground under consideration of the known hardness criteria wear faster when used for cutting metal record carriers if they are adjusted at a canting angle of, for example 15°, which is an angle favorable for quality recordings.

In principle, the invention resides in producing cutting diamonds by departing from the teaching established for pickup diamonds and shaping a diamond body whose cutting edges themselves do not lie in the center of the hard zone but, when installed under consideration of the canting angle, produce great resistance to the intensive stresses.

Figure 2:
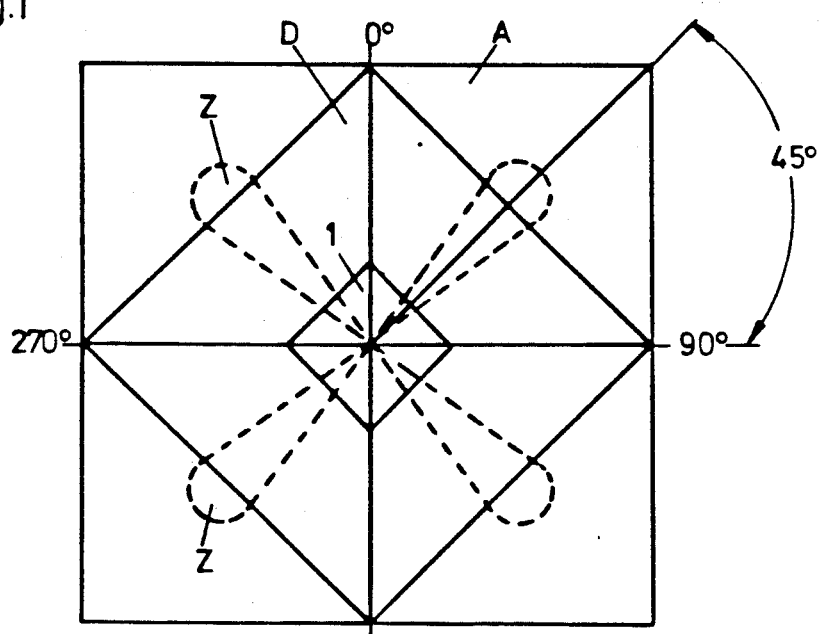
Figure 3:
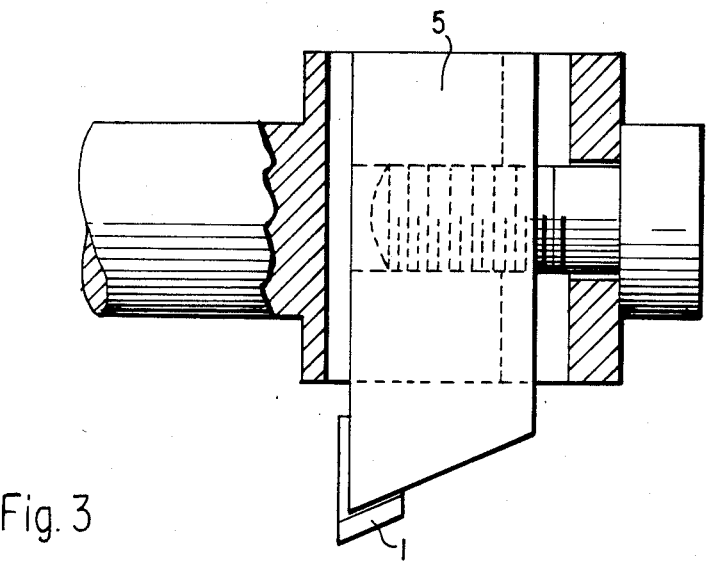
Figure 4:
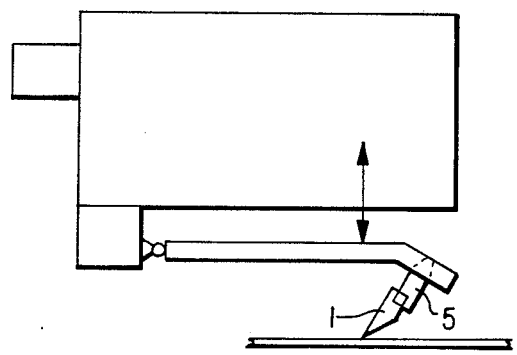
Figure 7:
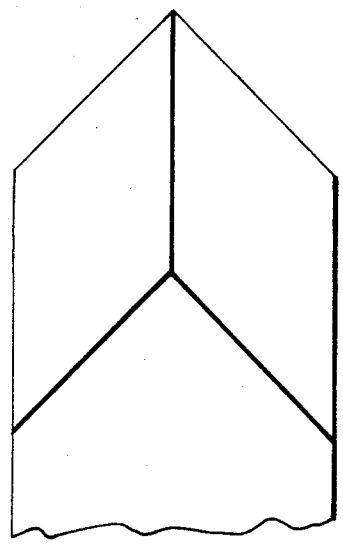

To explain the invention in detail, one embodiment thereof will be described below with reference to the drawings. These drawings show in:

FIG. 1, the known association of a diamond cube, octahedron and diamond body;

FIG. 2, a plan view of FIG. 1 with the four hardness zones indicated;

FIG. 3, a mount for a diamond body made from the octahedron and considering the hardness zones according to FIG. 2;

FIG. 4, a cutting device for phonograph records employing a canting angle for the cutting diamond;

FIG. 5, the diamond body shown in FIGS. 1 and 2 having edges of optimum hardness and, drawn into it, the diamond body according to the invention;

FIG. 6, a diamond body according to the invention with facets;

FIG. 7, a side view of FIG. 6.

FIG. 1 shows the association of a cube A and an octahedron D with the diamond body 1 to be worked out of them for a cutting stylus, as described, for example, in Ind. Diam. Rev. 1967, page 90, or in German Pat. No. 1,180,156. In connection with diamond pickups, it is known ([German patent application] No. P 2,319,407), when looking at such a diamond octahedron, to identify its surfaces by so-called Miller indices, as they are explained, for example, in the book by Charles Kittel, entitled "Einfüuhrung in die Festkörperphysik" [Introduction to Solid State Physics], published by Verlag Oldenbourg, 5th Edition, pages 32–34. If the cube is associated with a rectangular space coordinate system x, y, z, the upper horizontal plane of the cube would have the indices (001) and the normal to this plane would be the vertical line B in FIG. 1, which connects the upper and lower tips of the octahedron.

FIG. 2 is a plan view of FIG. 1 and indicates the hardness distribution. It can easily be seen here that the diamond has great hardness only in relatively small zones Z and can be operated as a tool in a wear resistant manner only in these zones. Already a slight deviation in adjustment reduces its hardness and thus the service life of the tool. Thus, a diamond body 1 cut according to this teaching should have the hardest possible cutting edges and exhibit relatively little wear.

FIG. 3 shows a mount 5 for a diamond body 1 cut according to the described hardness criteria. In this tool, diamond body 1 is positioned and fastened in mount 5 in such a manner that the once selected hard zones are retained with every subsequent grinding. A diamond body 1 positioned in this way has been found to be satisfactory for cutting record carriers, for example for cutting video informations into copper record carriers. If used for recordings of sound information with relatively deep groove depths in copper record carriers, the resulting noise in the sound reproduction, contrary to expectations, was very strong.

FIG. 4 shows a cutting arrangement for phonograph records with an adjustment of the diamond mount 5 shown in FIG. 3 which was able to considerably reduce the noise. A canting angle of about 15° for diamond body 1 was found to be particularly favorable. It was now noted that the diamond of the thus optimized cutting device exhibited relatively heavy wear. This relatively heavy wear of the diamond body was initially attributed to the excessively high stresses on the diamond due to the depth of the groove to be cut or the thickness of the chip to be removed. However, by using the diamond body 1a shown in FIG. 5, the wear resistance of the diamond can be improved even for low-noise sound recordings in copper.

FIG. 5 shows a diamond body 1a for low-noise sound recordings in copper layers. Diamond body 1a is drawn within the customary cut of a diamond body 1. The new cut has been selected so that the cutting face 2 in diamond body 1a has already been worked so as to have the canting angle intended for the cutting process.

In the adjusted operating state, the carbon atoms of the diamond are arranged in the crystal lattice in such a manner that they lie one behind the other in the cutting direction and thus produce the greatest resistance against the stresses of the cutting process. Thus, the diamond is intentionally cut and ground along less hard lines so that, in the operating state, the end effect is wear resistance. Since these cutting edges do not coincide with the natural edges, the correct position can be determined only with the aid of radiographs of the crystal lattice. The thus cut diamond body is adjusted and operated as shown in FIGS. 3 and 4.

It has now been found that a diamond shaped and adjusted as shown in FIG. 5 although its wear resistance during operation as a cutting device for phonograph records is considerably improved, is, at the same time, operated in a manner which enhances splitting. This means that, if the diamond is stressed intermittently, as this is the case during phonograph record recordings, it may split approximately parallel to the surface of the record carrier if only one microscopically small scratch is present. This could again considerably shorten the service life of the diamond for a cutting process. To avoid these occasionally occurring disadvantageous effects and nevertheless operate the diamond in a manner which is advantageous for wear reduction and with the least amount of noise for sound reproduction, a facet 4 is ground at the cutting edge as shown in FIG. 6. Facets on cutting diamonds are known but these known facets serve a different purpose and have a different consistency. The known facets serve to smooth the surface to be worked by pressing or the like and have an angle of more than 100° with respect to the cutting face of the diamond and a width of more than 2μ. The facet 4 according to the invention, however, has an angle of less than 100°, preferably 90°, with respect to the cutting face 2 of the diamond and a width of less than 1μ, particularly about 0.5μ. The purpose of this facet 4 is to prevent the creation of even microscopically small scratches which may lead to splitting of the diamond. The width of facet 4 should be narrow enough not to impair cutting ability.

I claim:

1. Arrangement for cutting information into a metal record carrier by means of a diamond body cut or ground out of a rough diamond (natural or synthetic octahedron crystal) under consideration of its hardness in the region of certain orientation lines for the cutting edge, particularly for the phonograph record industry, characterized in that, for the cutting process, the diamond body (1) is adjusted in such a manner that during cutting its cutting face (2) is operated at a canting angle of 5° to 20° and the diamond body (1) is ground in such a manner that its cutting face (2) forms an angle with respect to the (100) direction of the crystal lattice, such that during cutting at the canting angle, the atoms of the crystal lattice lie one behind the other in the cutting direction and the cutting edge (3) is stressed in the optimum hardness direction.

2. Arrangement according to claim 1, characterized in that the cutting edge (3) is provided with a ground-in facet which forms an angle of 70° to 100°, particularly 90°, with respect to the cutting face (2), so that the uniformity of the cutting edge (3) required for quality cuttings remains in effect over longer periods of time, even under great stress.

3. Arrangement according to claim 2, characterized in that the facet (4) is so narrow that the cutting ability [of the diamond] is not impaired and no burnishing effect is created from pressure or the like.

4. Arrangement according to claim 3, characterized in that the facet (4) has a width of less than 0.5μ.

5. Arrangement according to claim 1, characterized in that the cutting face (2) forms an angle of more than 5° and less than 20°, particularly 15°, with respect to the (100) direction of the diamond.

6. Arrangement according to claim 2, characterized in that the cutting face (2) forms an angle of more than 5° and less than 20°, particularly 15°, with respect to the (100) direction of the diamond.

7. Arrangement according to claim 3, characterized in that the cutting face (2) forms an angle of more than 5° and less than 20°, particularly 15°, with respect to the (100) direction of the diamond.

8. Arrangement according to claim 1, wherein the angle formed by the cutting face with respect to the (100) direction of the crystal lattice is substantially equal to the canting angle.

* * * * *